(12) United States Patent
Lin et al.

(10) Patent No.: US 10,571,706 B2
(45) Date of Patent: Feb. 25, 2020

(54) LIGHT FIELD DISPLAY APPARATUS AND DISPLAY METHOD OF LIGHT FIELD IMAGE

(71) Applicant: Coretronic Corporation, Hsin-Chu (TW)

(72) Inventors: Han-Hsuan Lin, Hsin-Chu (TW); Jui-Yi Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/158,318

(22) Filed: Oct. 12, 2018

(65) Prior Publication Data

US 2019/0113766 A1  Apr. 18, 2019

(30) Foreign Application Priority Data

Oct. 13, 2017  (CN) .......................... 2017 1 0952001

(51) Int. Cl.
*H04N 13/00* (2018.01)
*G02B 27/22* (2018.01)
(Continued)

(52) U.S. Cl.
CPC ......... *G02B 27/2214* (2013.01); *G02B 27/01* (2013.01); *G06T 5/00* (2013.01);
(Continued)

(58) Field of Classification Search
CPC .. H04N 13/128; H04N 13/307; H04N 13/139; G02B 27/01; G02B 27/2214; G06T 15/04; G06T 5/00; G06T 5/50
See application file for complete search history.

(56) References Cited

U.S. PATENT DOCUMENTS 9,261,704 B2  2/2016  Chang
9,723,295 B2  8/2017  Park
(Continued)

FOREIGN PATENT DOCUMENTS

AU       2013251640    11/2014
CN        105791793     7/2016
(Continued)

OTHER PUBLICATIONS

"Search Report of Europe Counterpart Application", dated Mar. 8, 2019, p. 1-p. 9.
(Continued)

*Primary Examiner* — Zhihan Zhou
(74) *Attorney, Agent, or Firm* — JCIPRNET

(57) ABSTRACT

A display method of a light field image adapted to a light field display apparatus is provided. The display method includes the following: providing an image having a plurality of depth values, wherein the depth values represent degrees of distance of the image; respectively obtaining a plurality of pixels in the image corresponding to the depth values respectively falling within a plurality of different extended depth value ranges based on the extended depth value ranges to from a plurality of layered images, wherein the extended depth value ranges are different from each other and are partially overlapped in sequence; forming the light field image based on the plurality of layered images; and providing a signal corresponding to the light field image to a display of the light field display apparatus. In addition, the light field display apparatus is also provided.

20 Claims, 9 Drawing Sheets

(51) Int. Cl.
  *G06T 5/00* (2006.01)
  *H04N 13/139* (2018.01)
  *H04N 13/307* (2018.01)
  *H04N 13/128* (2018.01)
  *G02B 27/01* (2006.01)
  *G06T 5/50* (2006.01)
  *G06T 15/04* (2011.01)

(52) U.S. Cl.
  CPC ............... *G06T 5/50* (2013.01); *G06T 15/04* (2013.01); *H04N 13/128* (2018.05); *H04N 13/139* (2018.05); *H04N 13/307* (2018.05)

(56) References Cited

U.S. PATENT DOCUMENTS

2010/0271467 A1* 10/2010 Akeley ................ H04N 13/398
                                                                    348/59
2014/0340390 A1    11/2014 Lanman et al.
2016/0142615 A1*  5/2016 Liang ................ H04N 5/23212
                                                                    348/222.1
2017/0208317 A1*  7/2017 Du ..................... G02B 27/0075

FOREIGN PATENT DOCUMENTS

| | | |
|---|---|---|
| CN | 105989574 | 10/2016 |
| CN | 107018323 | 8/2017 |
| KR | 20170058992 | 5/2017 |
| TW | 201624422 | 7/2016 |
| WO | 2017133113 | 8/2017 |

OTHER PUBLICATIONS

Douglas Lanman et al., "Near-Eye Light Field Displays," Nov. 1, 2013, Available at: https://research.nvidia.com/publication/near-eye-light-field-displays-0.

* cited by examiner

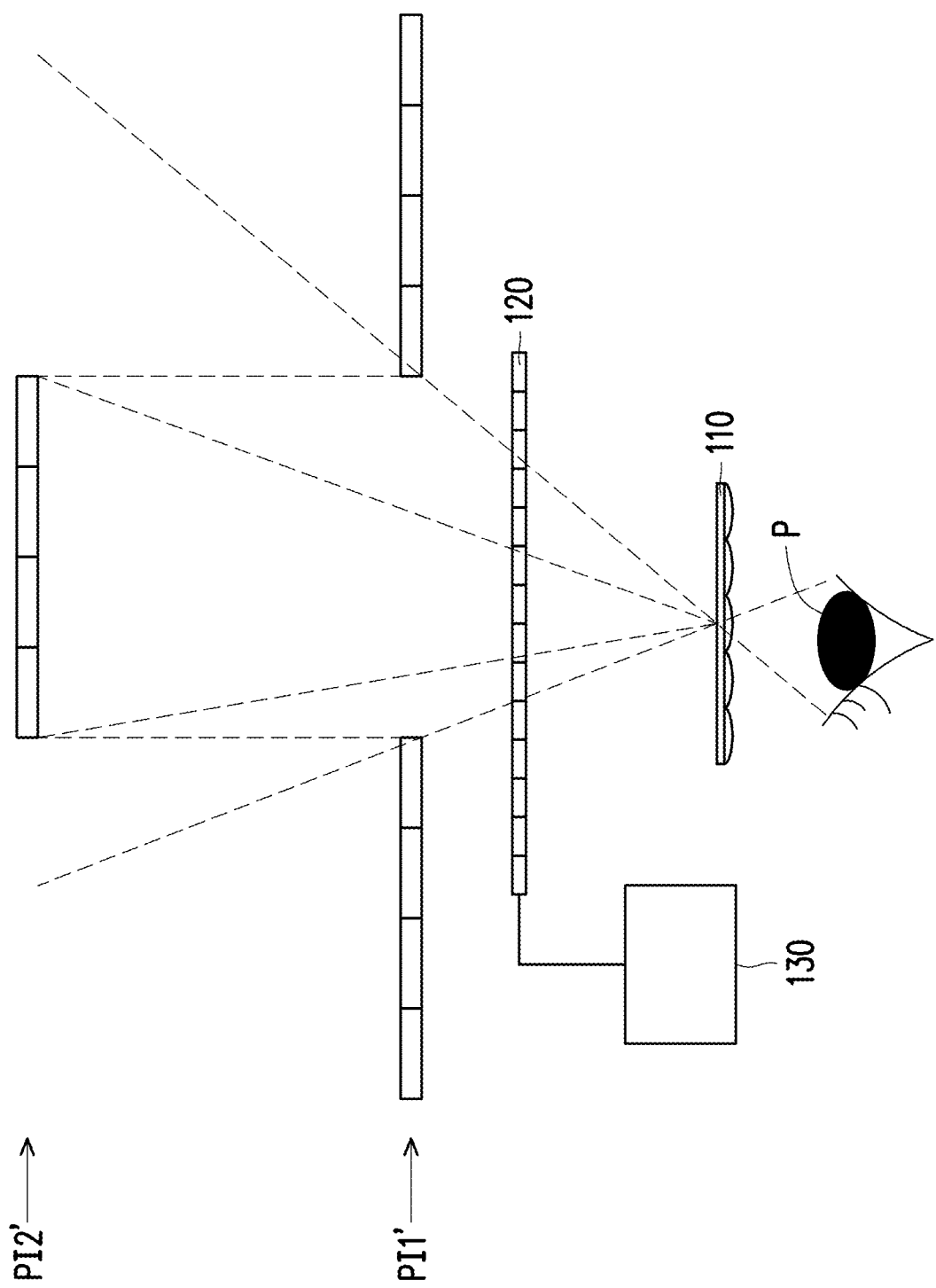

LIGHT FIELD DISPLAY APPARATUS AND DISPLAY METHOD OF LIGHT FIELD IMAGE

CROSS-REFERENCE TO RELATED APPLICATION

This application claims the priority benefit of China application serial no. 201710952001.X, filed on Oct. 13, 2017. The entirety of the above-mentioned patent application is hereby incorporated by reference herein and made a part of this specification.

BACKGROUND OF THE INVENTION

1. Field of the Invention

The invention relates to a display apparatus and an image display method of the display apparatus, and particularly relates to a light field display apparatus and a display method of a light field image.

2. Description of Related Art

In general, the technology of light field near-eye display displays a light field array image by using a display and forming an image in the user's eye by using a lens array alongside. When a light field array image ray is transmitted to the user through the lens array, the user is able to view a three-dimensional virtual image with depth after the display through the lens array. However, formation of a light field array image requires computation involving a large amount of data. Therefore, when the information for generating the light field array image is to be transmitted to the display, image processing is usually simplified in order to simplify the computation. For example, a three-dimensional image with depth information may be digitally layered to simplify image processing. Nevertheless, dividing an image into layers may result in generation of defects at discontinuous parts of depths where the layers are divided according to the depths, and disordered images may consequently be generated. Therefore, the three-dimensional virtual image viewed by the user may be unclear.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

One or some embodiments of the invention provide a light field display apparatus and a display method of a light field image capable of reducing defects resulting from depth differences in an image. Accordingly, the viewer is able to view a high quality image with a three-dimensional sense of depth.

Other objects and advantages of the invention can be further illustrated by the technical features broadly embodied and described as follows.

To achieve one, some, all of the objectives or other objectives, an embodiment of the invention provides a display method of a light field image adapted to a light field display apparatus. The display method includes the following: providing an image having a plurality of depth values, wherein the depth values represent degrees of distance of the image; respectively obtaining a plurality of pixels in the image corresponding to the depth values respectively falling within a plurality of different extended depth value ranges based on the extended depth value ranges to from a plurality of layered images, wherein the extended depth value ranges are different from each other and are partially overlapped with each other in sequence; forming a light field image based on the layered images; and providing a signal corresponding to the light field image to a display of the light field display apparatus.

To achieve one, some, all of the objectives or other objectives, another embodiment of the invention provides a light field display apparatus including a display, a lens array, and a processor. The display is configured to provide a light field image. The lens array is disposed on a side of the display for the light field image to pass through. The processor is electrically connected to the display. In addition, the processor respectively obtains a plurality of pixels in the image corresponding to the depth values respectively falling within a plurality of different extended depth value ranges based on the extended depth value ranges to form a plurality of layered images. The processor also forms a light field image based on the layered images, and providing a signal corresponding to the light field image to the display. The depth values represent degrees of distance of the image, and the extended depth value ranges are different from each other and partially overlapped with each other in sequence.

Based on the above, one or some embodiments of the invention at least includes one or more of the following advantages or effects. In one or some embodiments of the invention, by providing the image with depth values to the processor, and obtaining the pixels corresponding to the depth values in the image respectively falling within the extended depth value ranges by the processor based on the different extended depth value ranges, the respectively different and partially overlapped layered images are formed in sequence. In addition, the light field image is formed based on the layered images. Therefore, when the light field image is formed, since the layered images are partially overlapped, the defects generated at the discontinuous parts of depths where the layered images are divided according to the depths are reduced. Accordingly, the viewer is thus able to view the high quality image with a three-dimensional sense of depth.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6A is a schematic view illustrating that a light field display apparatus according to a comparative embodiment forms a light field image based on layered images.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
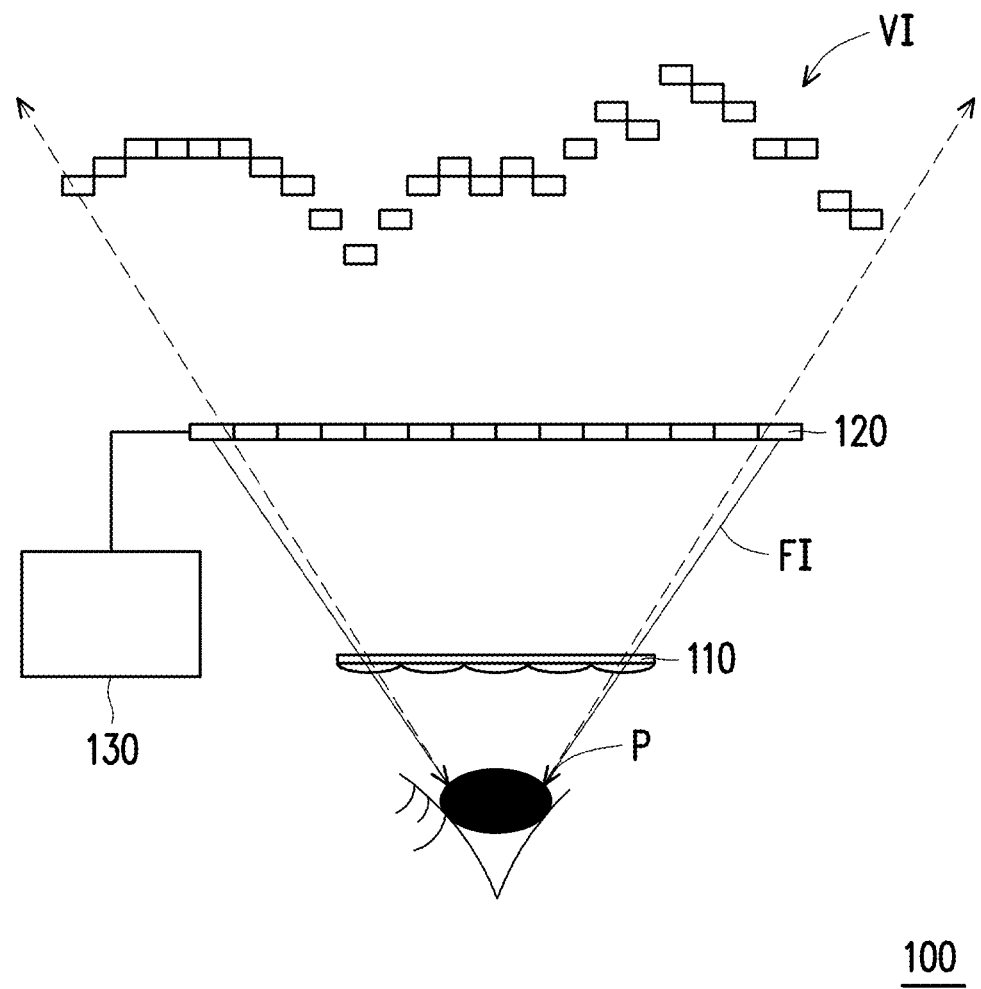
FIG. 1 is a schematic view illustrating a light field display apparatus according to an embodiment of the invention.
Figure 2:
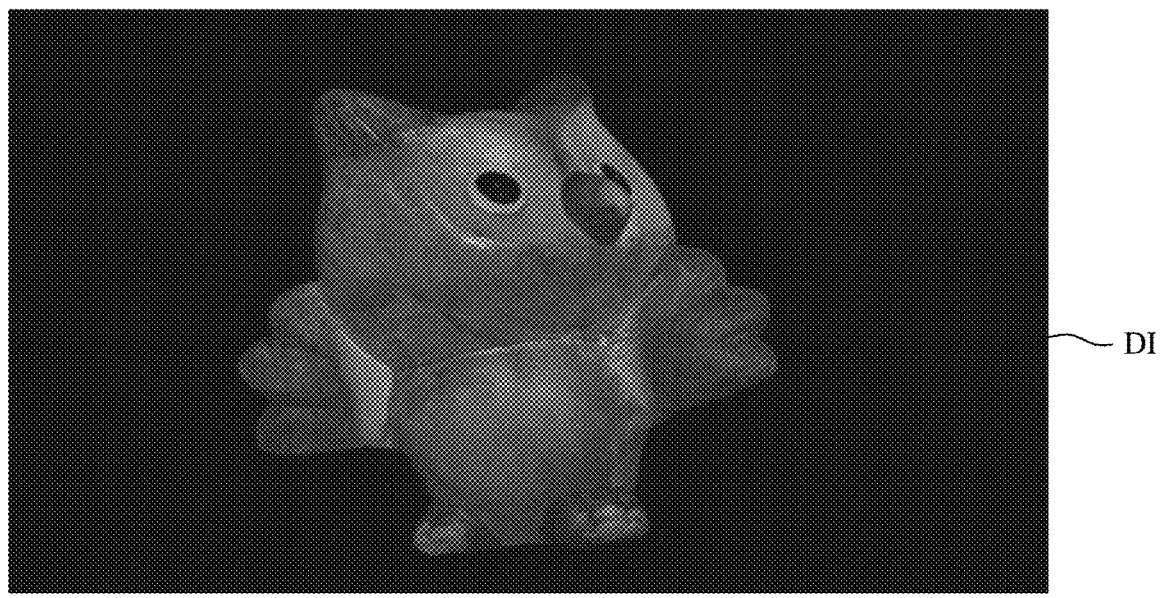
FIG. 2 is a schematic view illustrating an image having a plurality of depth values according to an embodiment of the invention.

FIG. 1 is a schematic view illustrating a light field display apparatus according to an embodiment of the invention. FIG. 2 is a schematic view illustrating an image having a plurality of depth values according to an embodiment of the invention. Referring to FIG. 1 and FIG. 2, in the embodiment, a light field display apparatus 100 includes a display 120, a lens array 110, and a processor 130. The display 120 is configured to provide a light field image ray FI. The lens array 110 is disposed on a side of the display 120 for the light field image ray FI to pass through. The processor 130 is electrically connected with the display 120 to provide a signal corresponding to the light field image to the display 120. In addition, the display 120 projects the light field image ray FI to a projection target P, such as a pupil of a human eye. In addition, the lens array 110 is disposed between the display 120 and the projection target P. In practical use, an external image source, such as a personal computer or other handheld apparatus, may transmit an image DI with depth values to the processor 130 in a wired or wireless manner. The processor 130 may modulate the image DI with depth values into the light field image ray FI, and the light field image ray FI may enter the projection target P after being emitted by the display 120 and passing through the lens array 110, and form an image after the projection target P. For example, the light field image ray FI may form an image on the retina of the user's eye. The projection target P may be the user's pupil, and may also be an aperture of an image pickup apparatus (such as a camera). The invention does not intend to impose a limitation on this regard. Accordingly, due to the parallax property of the lens array 110, the viewer is able to view a virtual image with depth, i.e., a viewed image with a three-dimensional sense of depth.

Figure 3:
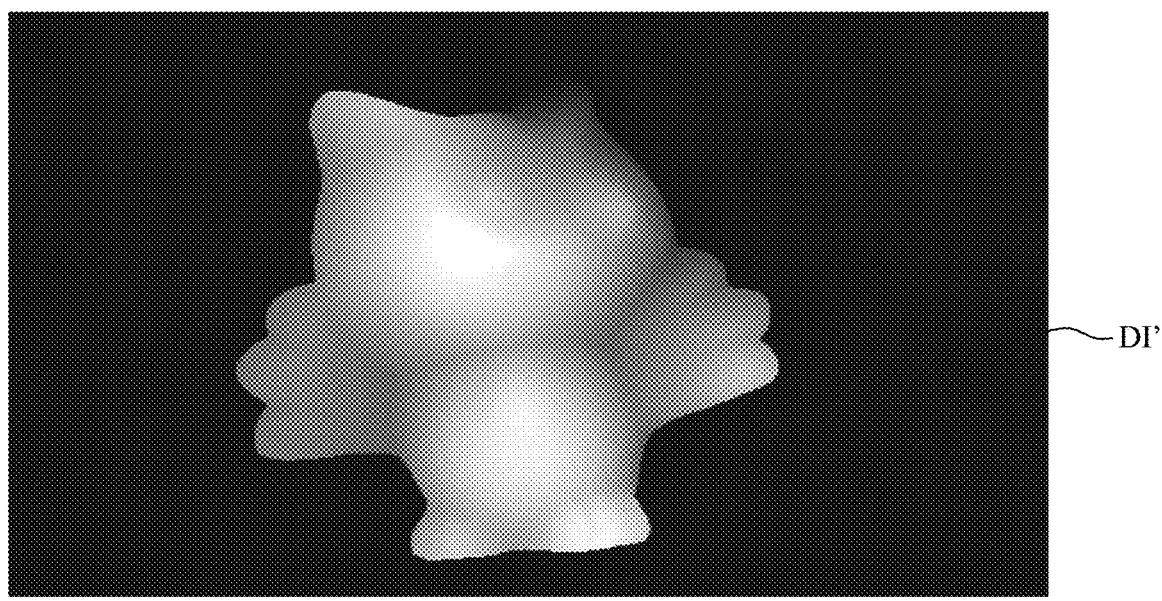
FIG. 3 is a schematic view illustrating that the image of FIG. 2 is grayscaled based on the depth values.
Figure 4A:
FIG. 4A to FIG. 4F are schematic views illustrating layered images with different extended depth value ranges of the image of FIG. 2.
Figure 4B:
Figure 4C:
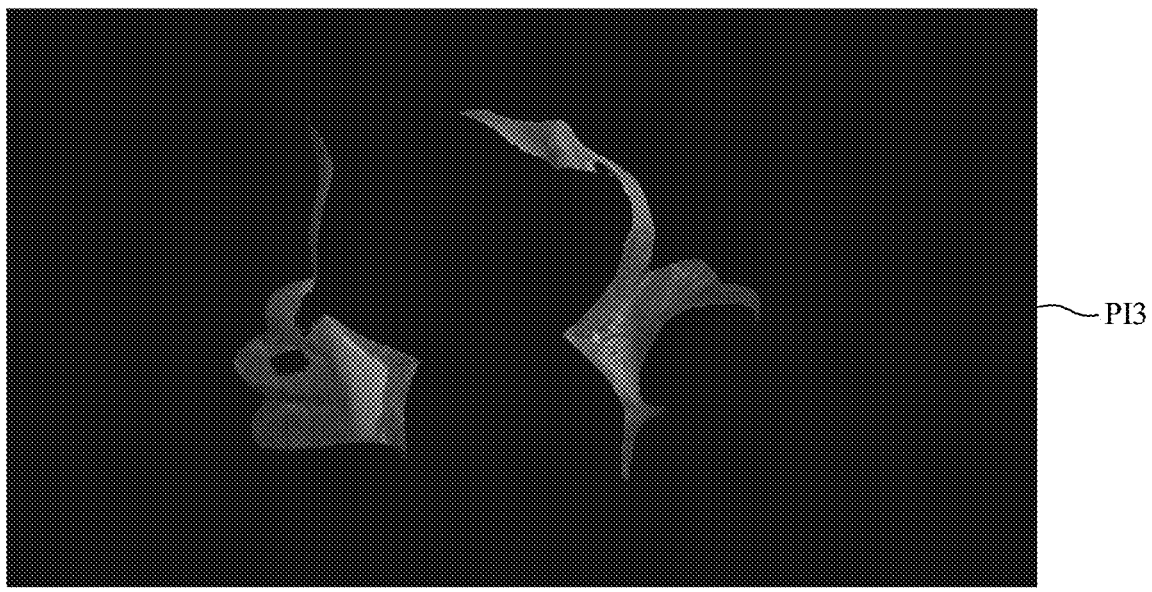
Figure 4D:
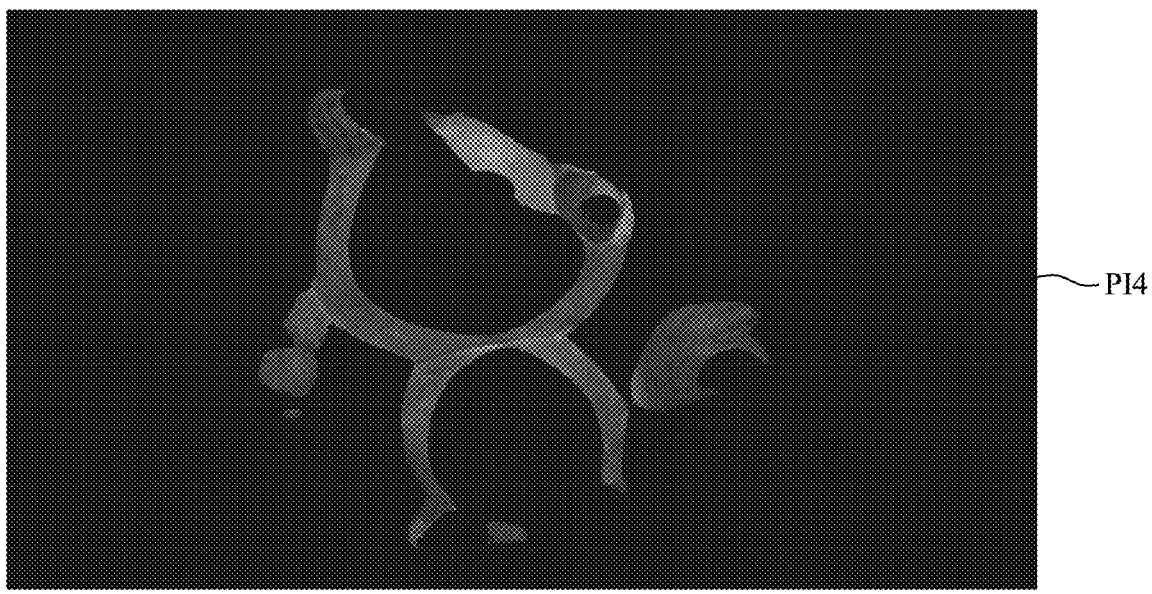
Figure 4E:
Figure 4F:
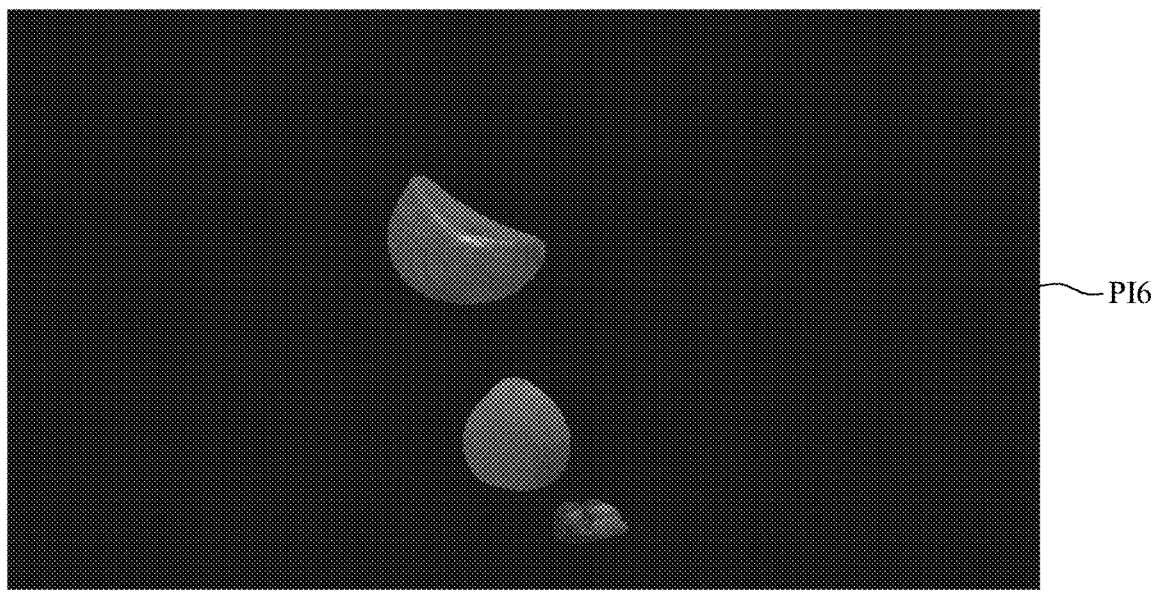

FIG. 3 is a schematic view illustrating that the image of FIG. 2 is grayscaled based on the depth values. Referring to FIG. 1 to FIG. 3, in the embodiment, a display method of the light field image FI is suitable for the light field display apparatus 100. The display method of the light field image FI includes a step as follows: providing the image DI with a plurality of depth values, wherein the depth values representing degrees of distance of the image. In other words, the degrees of distance in respective regions in the image DI may be represented by the depth values. Specifically, the image DI provided in the step is formed by a plurality of pixels, for example, and each of the pixels has a depth value information. Therefore, the image DI with the depth values is formed by combining the pixels with different depth value information, as shown in FIG. 2. To be more specific, by comparing grayscale values, it shall be appreciated that the range of the depth values may be defined to range from 0 to 255, for example, and the various grayscale degrees correspond to variation of the depth values. Hence, a grayscaled image DI' with 256 different grayscale degrees, as shown in FIG. 3, may be displayed.

FIG. 4A to FIG. 4F are schematic views illustrating layered images with different extended depth value ranges of the image of FIG. 2. Referring to FIG. 1, FIG. 2, and FIG. 4A to FIG. 4F, after the above step, a plurality of pixels in the image DI corresponding to a plurality of depth values respectively falling within a plurality of different extended depth value ranges are respectively obtained based on the extended depth value ranges, so as to form a plurality of layered images PI1, PI2, PI3, PI4, PI5, and PI6, as respectively shown in FIG. 4A to FIG. 4F. The extended depth value ranges are different from each other and are partially overlapped with each other in sequence. Specifically, in the embodiment, the processor 130 respectively obtain the pixels corresponding to the depth values in the image having a plurality of depth values based on the predetermined different extended depth value ranges. In addition, the depth values respectively fall within the extended depth value ranges. Accordingly, the layered images PI1, PI2, PI3, PI4, PI5, and PI6 are formed.

Specifically, in the embodiment, the step of forming the layered images further includes sequentially dividing a depth value range of the image DI into a plurality of depth value sub-ranges having partially identical range length values. Moreover, the range length values are defined as differences between upper limits and lower limits of the depth value sub-ranges. For example, if the depth value range of the image DI is 0 to 255, the depth value range from 0 to 255 may be divided into a plurality of depth value sub-ranges, such as six sub-ranges/layers, namely 0 to 41, 42 to 84, 85 to 127, 128 to 170, 171 to 212, and 213 to 255, having the same or similar range length values 41 to 42. In the embodiment, the "similar" range length value indicates that when the total range length of the depth value range is not divisible by the number of the depth value sub-ranges, some of the range length values may be greater or less by one than others when the total range length value is intended to be divided evenly.

Then, the processor 130 respectively change the depth value sub-ranges into a plurality of extended depth value ranges respectively greater than or equal to the respective corresponding depth value sub-ranges. In other words, the extended depth value ranges are respectively changed from the depth value sub-ranges. To be more specific, in the embodiment, the step further includes determining a plurality of range extension values based on the number of the depth value sub-ranges, and respectively joining the range extension values to the corresponding depth value sub-ranges to form the extended depth value ranges. In addition, the range extension values may be greater than or equal to zero. Hence, the range extension values may be adjusted based on the number of the depth value sub-ranges, and the range extension values may be respectively joined to the depth value sub-ranges to enlarge the depth value sub-ranges and thereby form the extended depth value ranges having a greater coverage. In general, the range extension values are smaller if the number of the depth value sub-ranges is greater, and the range extension values are greater if the number of the depth value sub-ranges is smaller.

In the embodiment, the step further includes respectively joining the range extension values to the upper limits and the lower limits of the corresponding depth value sub-ranges to form the respective extended depth value ranges, and respectively replacing the depth value sub-ranges with the respective corresponding extended depth value ranges. For example, in the embodiment, the processor 130 determines that the range extension values are 4 based on the six different depth value sub-ranges and then changes the depth value sub-range from 0 to 41 into a range from 0 to 45, changes the depth value sub-range from 42 to 84 into a range from 38 to 88, changes the depth value sub-range from 85 to 127 into a range from 81 to 131, and changes the rest of the depth value sub-ranges based on the same principle. The changed ranges are the corresponding extended depth value ranges replacing the corresponding depth value sub-ranges. In other words, the range extension value corresponding to the minimum of the lower limits of the extended depth value ranges is 0, and the range values of the depth value sub-ranges between the upper limit and the lower limit of the depth value range (i.e., 0 or 255) are extended by four. Here, "extend" means adding 4 to the upper limits and subtracting 4 from the lower limits.

In other embodiments, each of the range extension values is less than or equal to ⅛ of the range length value of the corresponding depth value sub-range. Alternatively, each of the range extension values is less than or equal to 1/128 of the total length value of the depth value ranges. For example, if the depth value range is from 0 to 255, and the number of the depth value sub-ranges is 16, the range extension values may be less than or equal to 2. However, the range extension values may be changed based on the needs in different embodiments, and the invention does not intend to impose a limitation on this regard.

In the embodiment, after the depth value sub-ranges are respectively changed into the extended depth value ranges, the corresponding layered images PI1, PI2, PI3, PI4, PI5, and PI6 are formed based on the respective extended depth value ranges, so as to complete formation of the layered images from the image DI. In other words, the layered images PI1, PI2, PI3, PI4, PI5, and PI6 are formed by the processor 130 by changing the image DI based on the respective extended depth value ranges. Specifically, in the embodiment, each of the layered images PI1, PI2, PI3, PI4, PI5, and PI6 has a layered depth value, and the layered depth value falls within the extended depth value range mapped from the layered image. In addition, the layered depth value is set as a depth value of the layered image. For example, in the embodiment, the layered depth value of the layered image PI1 is the average of the extended depth value range of the layered image PI1, namely the layered depth value is 21 falling within the extended depth value range from 0 to 41. Also, the layered depth value range of the layered image PI2 is the average of the extended depth value range of the layered image PI2, namely the layered depth value is 63 falling within the extended depth value range from 42 to 84. In other embodiments, the layered depth values of the layered images may also be, for example, medians of the extended depth value ranges of the layered images. The invention does not intend to impose a limitation on this regard.

Figure 5A:
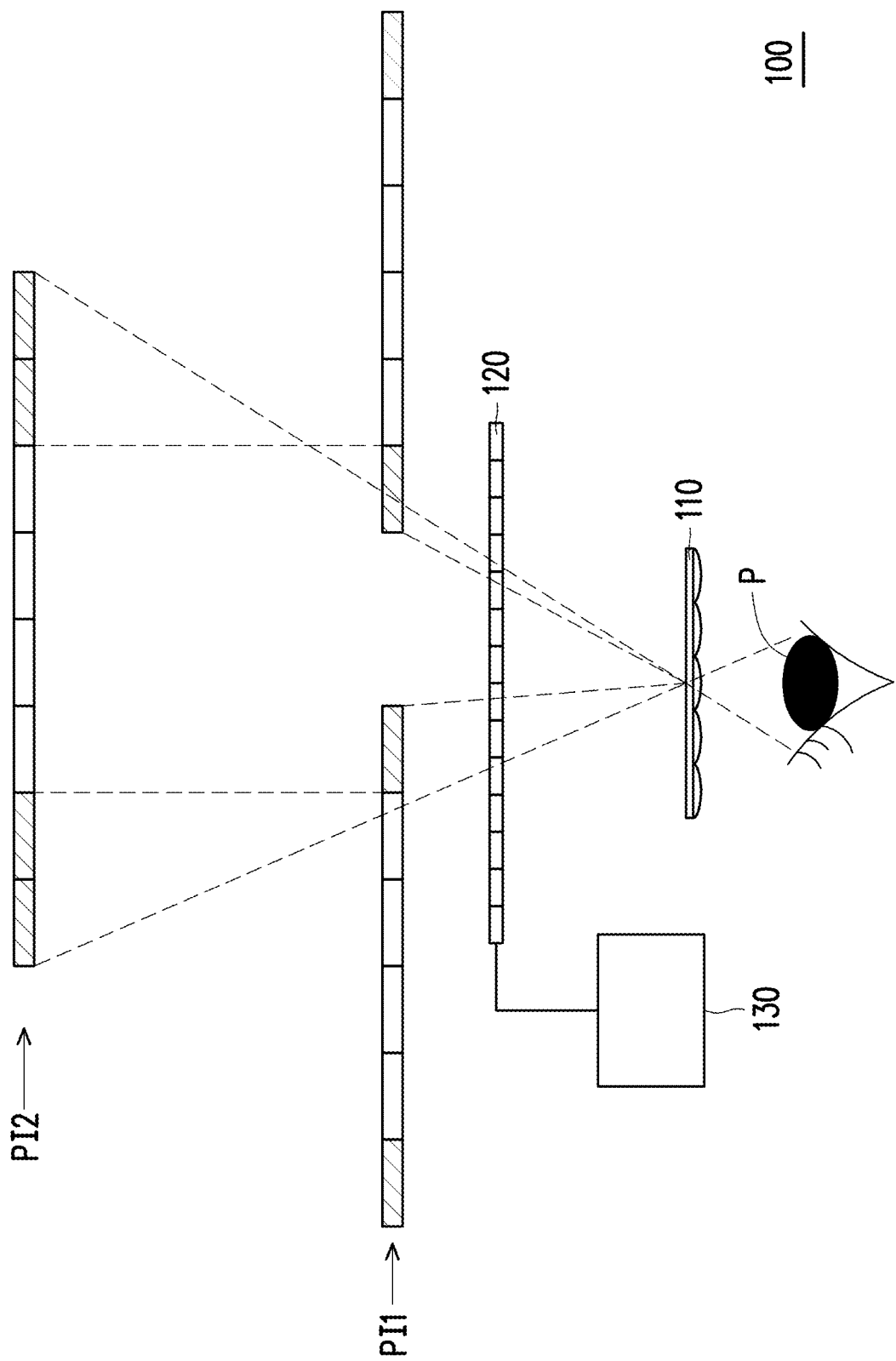
FIG. 5A is a schematic view illustrating that the light field display apparatus of FIG. 1 forms a light field image based on layered images.
Figure 5B:
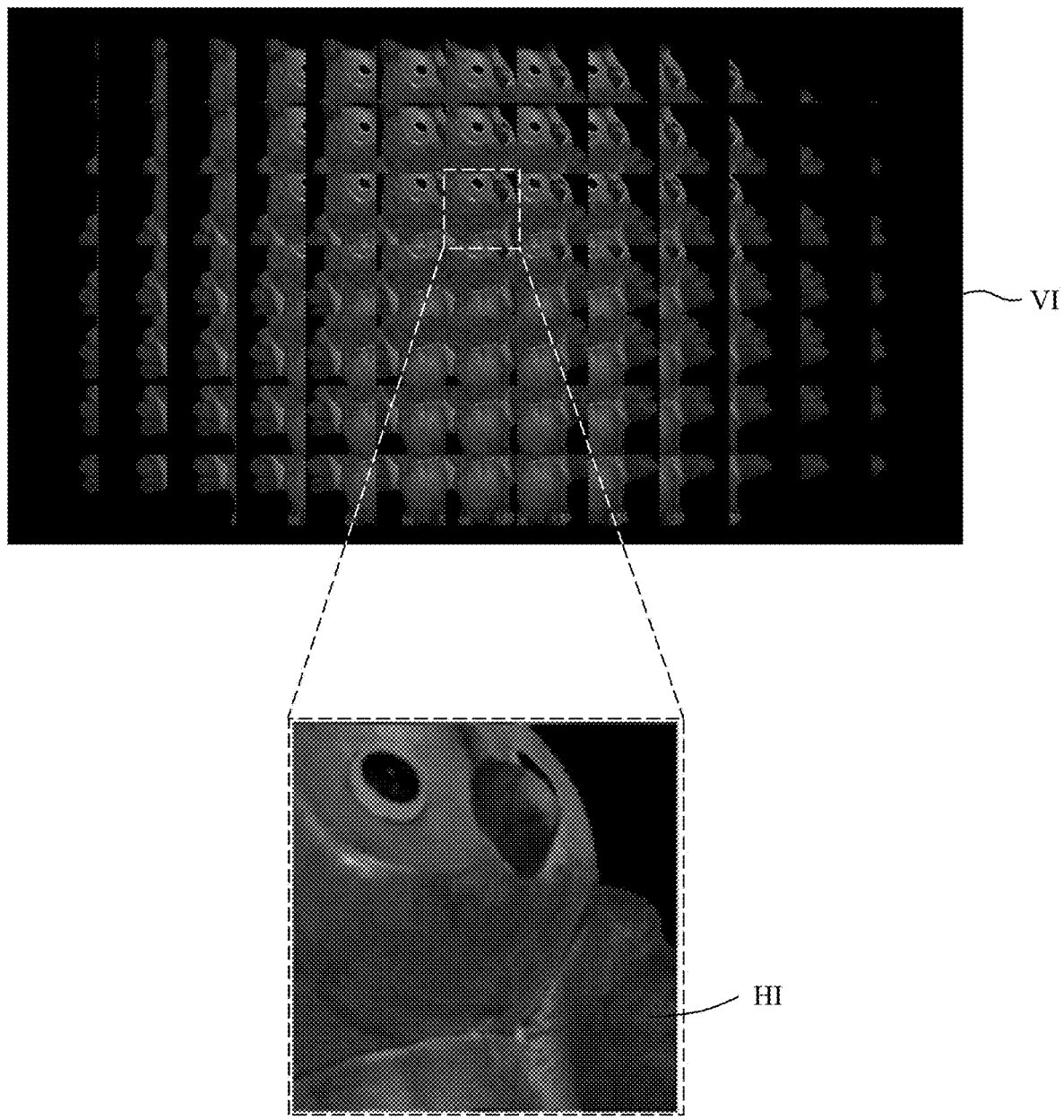
FIG. 5B is a schematic view illustrating the light field image of FIG. 5A on a display.

FIG. 5A is a schematic view illustrating that the light field display apparatus of FIG. 1 forms a light field image based on layered images. FIG. 5B is a schematic view illustrating the light field image of FIG. 5A on a display. Referring to FIG. 5A and FIG. 5B, for the ease of illustration, FIG. 5A only illustrates some of the layered images and pixels. In the embodiment, after the above step, a light field image VI is formed based on the layered images PI1 and PI2, and the processor 130 provides a signal corresponding to the light field image VI to the display 120 of the light field display apparatus 100. In other words, the processor 130 forms the light field image VI based on the layered images PI1 and PI2 and provides the light field image VI to the display 120, so as to obtain and provide a high quality viewed image HI with a three-dimensional sense of depth for the viewer's viewing. Besides, the light field image VI is formed by repetitively displaying the image DI having depth values, and the image DI with depth values is shifted in correspondence with a lens position of the lens array 110. Hence, through the lens array 110, the viewer is able to view the light field image VI provided by the display 120 as the viewed image HI that is complete and has a three-dimensional sense of depth.

Specifically, in the embodiment, the step further includes forming the light field image VI based on the layered image PI1 and PI2 and the respective corresponding layered depth values. Specifically, in the embodiment, the processor 130 combines the layered image PI1 corresponding to the layered depth value of 12, the layered image PI2 corresponding to the layered depth value of 31, and the rest layered images to form the light field image VI, and the processor 130 provides the signal corresponding to the combined light field image VI to the display 120, so as to display the light field image VI at the projection target P through the lens array 110. Since the extended depth value ranges of the layered images PI1 and PI2 and the rest layered images are different from each other and partially overlapped in sequence, the layered images PI1 and PI2 and the rest layered images are partially overlapped when the light field image VI is formed. Consequently, defects generated at discontinuous parts of depths where the layered images are divided according to the depths are reduced (i.e., reducing the problem of depth values without image located at boundaries of the layers) and disordered images are thus prevented from being generated in the viewed image HI. Therefore, the defects in the viewed image HI due to differences in depths may be reduced, and the viewer is able to view the high quality viewed image HI having a three-dimensional sense of depth.

In an embodiment, the processor 130 is a central processing unit (CPU), a microprocessor, a digital signal processor (DSP), a programmable controller, a programmable logic device (PLD), other similar devices, or a combination thereof, for example. Nevertheless, the invention does not intend to impose a limitation on this regard. Besides, in an embodiment, the respective functions of the processor 130 may be implemented as a plurality of programming codes. The programming codes may be stored in an internal storage for execution by the processor 130. Alternatively, in an embodiment, the respective functions of the processor 130 may be implemented as one or more circuits. The invention does not intend to impose a limitation on whether the respective functions of the processor 130 are implemented in a software or hardware form.

Figure 6B:
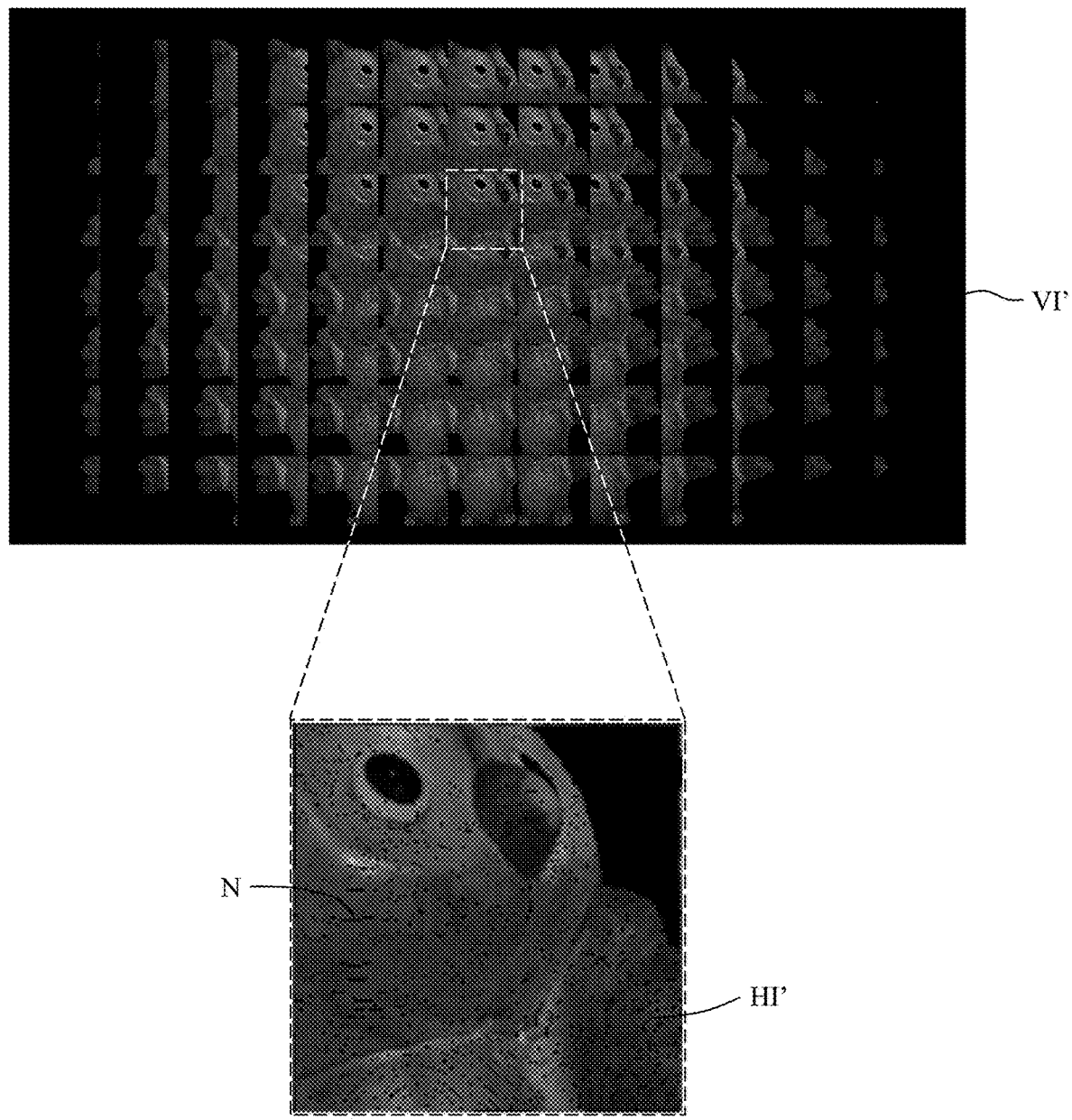
FIG. 6B is a schematic view illustrating the light field image of FIG. 6A on a display.

FIG. 6A is a schematic view illustrating that a light field display apparatus according to a comparative embodiment forms a light field image based on layered images. FIG. 6B is a schematic view illustrating the light field image of FIG. 6A on a display. Referring to FIG. 6A and FIG. 6B, in a light field display apparatus 50 of the comparative embodiment, a light field image VI' is formed by non-overlapped layered images PI1', PI2' and rest the layered images. Therefore, defects are formed at the discontinuous parts of depths where the layered images are divided according to the depths. Therefore, a disordered image N is generated in the viewed image HI', and the image HI' viewed by the viewer is an image with disordered images.

In view of the foregoing, one or some embodiments of the invention at least includes one or more of the following advantages or effects. In one or some embodiments of the invention, by providing the image with depth values to the processor, and obtaining the pixels corresponding to the depth values in the image respectively falling within the extended depth value ranges by the processor based on the different extended depth value ranges, the respectively different and partially overlapped layered images are formed in sequence. In addition, the light field image is formed based on the layered images. Therefore, when the light field image is formed, since the layered images are partially overlapped, the defects generated at the discontinuous parts of depths where the layered images are divided according to the depths are reduced, so as to prevent the disordered images from being generated in the viewed image. Accordingly, the defects in the viewed image due to differences in depth may be reduced, and the viewer is thus able to view the high quality image with a three-dimensional sense of depth.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display method of a light field image, adapted for a light field display apparatus, comprising:
   providing an image with a plurality of depth values, wherein the depth values represent degrees of distance of the image;
   respectively obtaining a plurality of pixels in the image corresponding to the depth values respectively falling within a plurality of different extended depth value ranges based on the extended depth value ranges, so as to form a plurality of layered images, wherein the extended depth value ranges are different from each other and are partially overlapped with each other in sequence;
   forming a light field image based on the layered images; and
   providing a signal corresponding to the light field image to a display of the light field display apparatus,
   wherein the light field display apparatus has a depth value range, and the depth values of the image fall within the depth value range, and forming the layered images from the image comprises:
   dividing the depth value range into a plurality of depth value sub-ranges in sequence, wherein the depth value sub-ranges have range length values, and the range length values are differences between upper limits and lower limits of the depth value sub-ranges;
   respectively changing the depth value sub-ranges into the different extended depth value ranges, wherein each of the extended depth value ranges is greater than or equal to the corresponding depth value sub-range; and
   forming the respective corresponding layered images from the image based on the respective extended depth value ranges.

2. The display method according to claim 1, wherein changing the depth value sub-ranges into the different extended depth value ranges comprises:

determining a plurality of range extension values based on the number of the depth value sub-ranges, wherein the range extension values are greater than or equal to 0; and respectively joining the range extension values to the corresponding depth value sub-ranges to form the different extended depth value ranges.

3. The display method according to claim 2, wherein the range extension value corresponding to a minimum of the lower limits of the different extended depth value ranges is 0.

4. The display method according to claim 2, wherein each of the range extension values is less than or equal to $\frac{1}{8}$ of the corresponding range length value.

5. The display method according to claim 2, wherein each of the range extension values is less than or equal to $\frac{1}{128}$ of a total length value of the depth value ranges.

6. The display method according to claim 2, wherein joining the range extension values to the depth value sub-ranges to form the different extended depth value ranges comprises:

respectively joining the range extension values to the upper limits and the lower limits of the depth value sub-ranges to form the respective extended depth value ranges; and replacing the depth value sub-ranges with the respective corresponding extended depth value ranges.

7. The display method according to claim 1, wherein each of the layered images has a layered depth value falling within the extended depth value range mapped from the layered image, and the layered depth value is set as a depth value of the layered image.

8. The display method according to claim 7, wherein forming the light field image based on the layered images comprises:

forming the light field image based on the layered images and the layered depth values respectively corresponding to the layered images.

9. The display method according to claim 7, wherein the layered depth value of each of the layered images is an average or a median of the corresponding extended depth value range.

10. A light field display apparatus, comprising:

a display, configured to provide a light field image, wherein the light field image is transmitted to a projection target;

a lens array, disposed on a side of the display to transmit the light field image to the projection target, wherein the lens array is located between the display and the projection target; and a processor, electrically connected to the display, respectively obtaining a plurality of pixels in the image corresponding to the depth values respectively falling within a plurality of different extended depth value ranges based on the extended depth value ranges to form a plurality of layered images, forming a light field image based on the layered images, and providing a signal corresponding to the light field image to the display, wherein the depth values represent degrees of distance of the image, and the extended depth value ranges are different from each other and are partially overlapped with each other in sequence;

wherein the light field display apparatus comprises a depth value range, the depth values of the image fall within the depth value range, the depth value range sequentially comprises a plurality of depth value sub-ranges having range length values, the range length values are differences between upper limits and lower limits of the depth value sub-ranges, the different extended depth value ranges are changed from the depth value sub-ranges, and each of the extended depth value ranges is greater than or equal to the corresponding depth value sub-range.

11. The light field display apparatus according to claim 10, wherein each of the layered images is formed by the processor by changing the image based on each of the extended depth value ranges.

12. The light field display apparatus according to claim 10, wherein the processor determines a plurality of range extension values based on the number of the depth value sub-ranges, and the range extension values are greater than or equal to 0.

13. The light field display apparatus according to claim 12, wherein the different extended depth value ranges are formed by respectively joining the range extension values to the corresponding depth value sub-ranges.

14. The light field display apparatus according to claim 13, wherein the range extension value corresponding to a minimum of the lower limits of the different extended depth value ranges is 0.

15. The light field display apparatus according to claim 13, wherein each of the range extension values is less than or equal to $\frac{1}{8}$ of the corresponding range length value.

16. The light field display apparatus according to claim 13, wherein each of the range extension values is less than or equal to $\frac{1}{128}$ of a total length value of the depth value ranges.

17. The light field display apparatus according to claim 13, wherein the respective extended depth value ranges are formed by respectively joining the range extension values to the upper limits and the lower limits of the depth value sub-ranges.

18. The light field display apparatus according to claim 10, wherein each of the layered images has a layered depth value falling within the extended depth value range mapped from the layered image, and the layered depth value is set as a depth value of the layered image.

19. The light field display apparatus according to claim 18, wherein the light field image is formed by the processor based on the layered images and the layered depth values respectively corresponding to the layered images.

20. The light field display apparatus according to 18, wherein the layered depth value of each of the layered images is an average or a median of the corresponding extended depth value range.

* * * * *